Feb. 12, 1952          W. H. LEE ET AL          2,585,475
DIRECT READING EDDY CURRENT DYNAMOMETER

Filed Nov. 14, 1946                              2 SHEETS—SHEET 1

INVENTOR.
WILLIAM H. LEE
BY ERASMUS D. SMITH

ATTORNEYS.

INVENTOR.
WILLIAM H. LEE
BY ERASMUS D. SMITH
Bosworth & Sessions
ATTORNEYS.

Patented Feb. 12, 1952

2,585,475

UNITED STATES PATENT OFFICE 2,585,475

DIRECT READING EDDY CURRENT DYNAMOMETER

William H. Lee, Chagrin Falls, and Erasmus D. Smith, Shaker Heights, Ohio, assignors to The Electric Products Company, Cleveland, Ohio, a corporation of Ohio Application November 14, 1946, Serial No. 709,862

13 Claims. (Cl. 73—134)

This invention relates to dynamometers of the eddy current type and more particularly to such dynamometers equipped to give direct horsepower readings without requiring any calculations.

Eddy current dynamometers or brakes are used extensively in measuring power. Ordinarily, such dynamometers are mounted in cradles or trunnions with an arm extending to a scale or the like so that the torque of the machine can be measured. The speed of rotation is measured by a tachometer, and from the torque and speed readings, the horsepower absorbed by the machine can be calculated. An object of the present invention is to provide eddy current dynamometers arranged so that direct readings of horsepower can be obtained from electrical instruments connected to the dynamometers, thus eliminating the need for cradle mounting of the machines and eliminating the necessity for calculating the horsepower from speed and torque readings. Another object is to provide such direct reading dynamometers which will give accurate horsepower readings under various operating conditions. A further object is to provide simple electrical circuits for such dynamometers.

Figure 1:
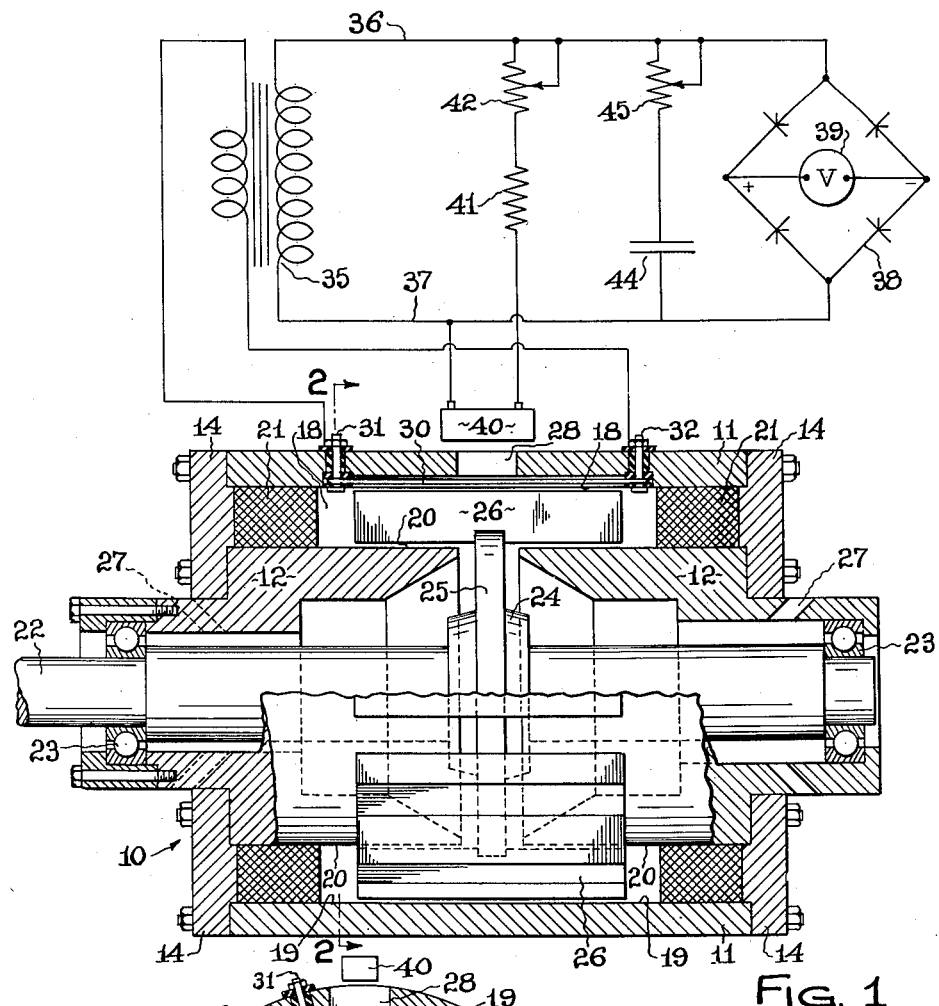
Figure 2:
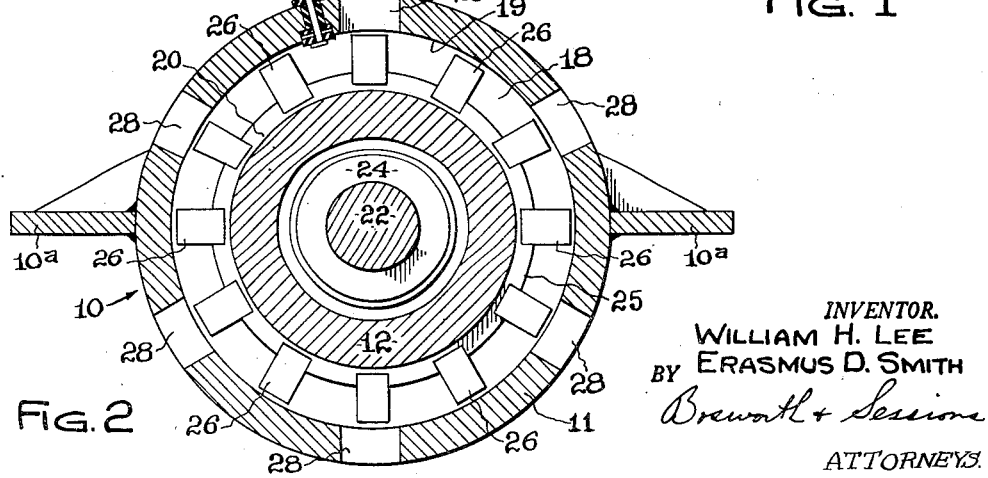
Figure 3:
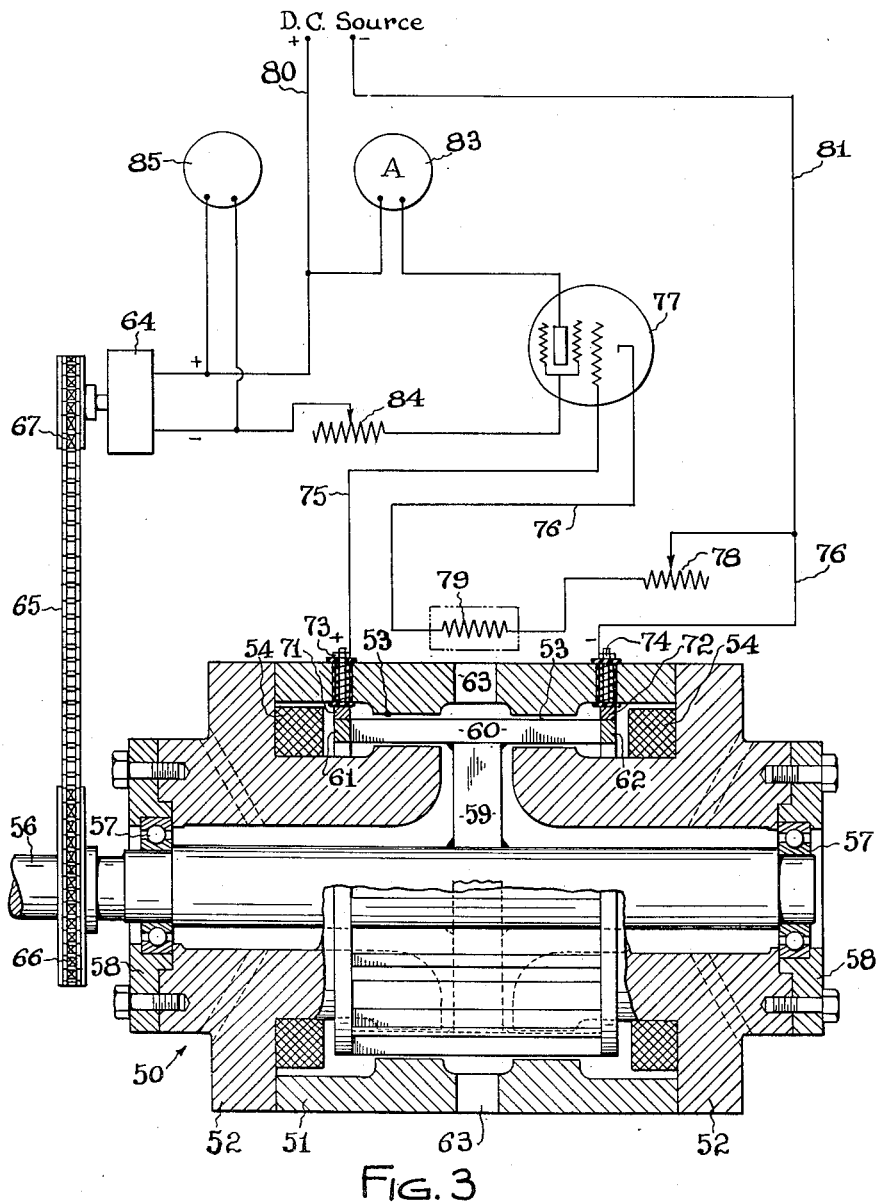

Other objects and advantages of the invention will become apparent from the following description of a preferred form thereof, reference being made to the accompanying drawings in which Figure 1 is a longitudinal sectional view of an eddy current dynamometer embodying our direct reading meter, the figure also diagrammatically showing the electrical circuits for the meter; Figure 2 is a transverse sectional view through the dynamometer of Figure 1, the section being taken along the line 2—2 of Figure 1; and Figure 3 is a view similar to Figure 1, but showing a modified type of dynamometer and a modified circuit therefor.

Eddy current dynamometers ordinarily comprise field structures or stators including field coils for producing a magnetic field across an air gap. The rotor consists of a member made of magnetic material and having a plurality of bars or teeth which rotate in the air gap. The cutting of the lines of force by the bars or teeth generates voltages in the bars or teeth which are functional of the power absorbed by the machine. Also, the flux density at each point in the pole faces of the stationary field structure changes rapidly with the passage of the bars or teeth past the point, thus generating voltages in the pole faces which are also functional of the power absorbed by the machine. According to the present invention, one of these voltages, a voltage proportional thereto, or a current resulting from such a voltage is compensated for the effects of changes in temperature and changes in the speed of operation of the machine, and the voltage or current so compensated is applied to a volt meter or ammeter which preferably is calibrated to read directly in horsepower. By this means accurate, direct reading, eddy current dynamometers can be provided at reasonable cost.

Referring now to the drawings, in Figures 1 and 2 we have illustrated a dynamometer in which the voltage induced in a pole face of the stator is used to give the indication of horsepower. In this form of our invention, the dynamometer proper is indicated in general at 10 and consists of a stator provided with supporting brackets 10a and made up of a cylindrical outer frame member 11, inner annular members 12 at opposite ends of the machine and end members 14 to which the members 11 and 12 are bolted. The stator parts are composed of steel or other ferro-magnetic material and provide a field structure having annular air gaps 18 on opposite sides of the center of the machine between the inner cylindrical surface or pole face 19 of member 11 and the outer cylindrical surfaces or pole faces 20 of the inner members 12. Field coils 21, which are energized from an external D. C. supply, create the flux. The field strength can be varied by varying the energization of the coils 21 by any convenient means (not shown).

The rotor comprises a shaft 22 supported in the frame members 12 by suitable bearings 23 and carrying a central hub member 24 which is keyed and preferably brazed to the shaft. The hub member in turn supports a ring 25 composed of brass or other non-magnetic material, and the rotor bars 26 are carried on the outer periphery of the ring 25, preferably being brazed thereto. The rotor bars 26 are composed of steel or other ferro-magnetic material, and the ends of the bars extend into the air gaps. The machine is cooled by air flowing into the interior of the frame through the ports 27 and discharged through ports 28, the rotor acting as an impeller for the air.

Shaft 22 may be provided with any convenient means (not shown) for connecting it to the engine, motor or the like whose power output is to be measured. Rotation of the shaft 22 causes the rotor bars to pass successively by each axially extending line or element of the cylindrical pole faces 19 and 20 of the stator. The flux density at each element thus changes rapidly as the rotor is rotated; the flux density being greatest when a rotor bar is adjacent the element and being least when a space between rotor bars is adjacent the element. Thus, alternating voltages are generated in the pole faces creating eddy currents in the pole faces which are converted to heat. The power loss in the machine in the form of heat is equal to the power input to the machine, and neglecting mechanical and windage losses, the power loss in the machine in the form of heat in the pole faces is equal to $I^2R$, where I is the value of the eddy current and R the resistance of the material. Since the current I is proportional to E, the induced voltage, the power loss is a function of E. The power loss may also be expressed as follows, where P is the power in watts and $\cos \theta$ is the power factor:

(1) $$P = EI \cos \theta$$

This may also be expressed as:

(2) $$P = E \cdot \frac{E}{Z} \cdot \frac{R}{Z}$$

where Z is the impedance of the steel pole faces. Substituting $$\sqrt{R^2 + X^2}$$

for Z, X being the reactance of the pole faces, we have:

(3) $$P = E \cdot \frac{E}{\sqrt{R^2+X^2}} \cdot \frac{R}{\sqrt{R^2+X^2}}$$
$$= \frac{E^2 R}{R^2 + X^2}$$

Thus, a voltage generated in a pole face of the dynamometer, or a current resulting therefrom, may be used as a measure of the power absorbed thereby. In order to obtain accurate results, the voltage should be compensated for changes in resistance of the pole faces due to changes in temperature, and for changes in reactance due to changes in the frequency of the induced voltage. Also, the measurement of a voltage generated in a pole face itself would be difficult. Therefore, we prefer to utilize the construction shown in the drawings wherein a conductor 30 is embedded in the pole face 19, the conductor extending parallel to the axis of the pole face and being insulated therefrom.

Terminals 31 and 32 are extended outwardly through the wall of the frame member 11 to provide for connecting the conductor 30 to the external circuit, the terminals also being insulated from the member 11. Inasmuch as the conductor 30 in the arrangement shown is exposed to the same changes in flux as the pole faces and may be considered as being, in effect, an element of the cylindrical pole face 19 insulated from the remainder of the pole face, the voltage induced in the conductor 30 will be proportional to the voltage induced in the pole faces. Thus, a voltmeter connected across the terminals 31 and 32 will give readings proportional to the power absorbed by the dynamometer provided proper corrections are made for changes in resistance and reactance of the pole faces due to changes in temperature of the machine and frequency of the generated voltage, respectively.

In order automatically to compensate for such changes in temperature and frequency or speed, we have provided the circuit shown in the upper part of Figure 1. This includes a transformer 35, the primary of which is connected to the terminals 31 and 32. The transformer steps up the voltage induced in the conductor 30, and the transformer secondary is connected by conductors 36 and 37 to the rectifier 38, the output of which is connected to the voltmeter 39, which is preferably calibrated to read directly in horsepower. The transformer is preferably located as close to the dynamometer as possible so that short heavy leads can be employed from the terminals 31 and 32. Thus, inaccuracies due to the IR drop between the conductor 30 and transformer 35 are minimized; the current is stepped down by the transformer, hence the IR drop in the secondary circuit does not substantially affect the accuracy of the readings.

To compensate the voltmeter circuit for changes in temperature of the dynamometer, we preferably employ the resistor circuit 40, 41, 42, which is connected across the conductors 36 and 37 in parallel with the voltmeter. From the equations given above, it will be seen that in dynamometers wherein the resistance is a greater factor in the total impedance than the reactance, as is ordinarily the case with dynamometers of the type illustrated, an increase in resistance resulting from an increase in temperature will cause a reduction in the amount of power absorbed for a given voltage. Accordingly, for such dynamometers the resistor 40 is composed of carbon or other suitable material having a negative temperature coefficient of resistivity, and is located, as shown in the drawings, in the path of the heated air discharged from the port 28 in the outer frame member 11. Thus, the temperature of the resistor 40 will vary substantially with the temperature of the dynamometer. As the temperature of the dynamometer increases, the resistance thereof will also increase, which as noted above, would give, unless compensated for, a disproportionately high value for the voltage applied to voltmeter 39. The resistance of resistor 40, however, will become less as the temperature increases, and thus the resistor circuit 40, 41, 42 will draw more current at higher temperatures than at low temperatures, thereby reducing the voltage across the voltmeter 39 and compensating for the effect of the increased temperature of the dynamometer. The resistor 41 is a fixed resistance incorporated in the circuit to bring the total resistance of the resistance circuit to approximately the desired value, while the variable resistor 42 is employed to bring the resistance of the circuit to the correct value to give accurate power readings under varying temperature conditions. In dynamometers wherein the reactance is the predominant factor in the impedance, it may be necessary to use resistors with positive coefficients of resistivity in order to compensate the apparatus to give accurate readings. The proper type of resistor for any given machine under a given range of operating conditions can be determined readily by substituting approximate values of the resistance and reactance in Equation 3 above and determining the effect of changes in resistance on the power value with E remaining constant.

As the speed of the dynamometer is increased, the frequency of the induced voltages and of the eddy currents is also increased, thus increasing the reactance of the pole faces. To compensate for changes in frequency, the condenser 44 and variable resistor 45 are connected across the lines 36 and 37 in parallel with the resistor circuit 40, 41, 42. At low frequencies, the condenser 44 will draw relatively small current, but as the speed of the dynamometer and the frequency of the generated voltage increases, the circuit 44, 45 will draw increasing amounts of current, thus reducing the voltage across the voltmeter as the frequency increases and compensating for the increased reactance of the pole faces. The variable resistor 45 is provided to adjust the circuit to give the desired compensating effect.

In adjusting the compensating circuit, the dynamometer is operated at several known loads at different temperatures and speeds, and the resistors 42 and 45 are adjusted so that the voltmeter will give accurate power readings under varying conditions. In carrying out the adjustment, the apparatus preferably is first run at a constant speed and load, and the temperature compensating circuit is adjusted by means of the resistor 42 so that substantially constant horsepower readings are obtained under different operating temperatures. The speed of operation is then varied while the load is maintained substantially constant, and the resistor 45 in the frequency compensating circuit is adjusted to give substantially constant power readings under varying speed conditions. Inasmuch as the temperature compensating and frequency compensating circuits affect each other, it is ordinarily necessary to make several adjustments during several different temperature and speed runs in order to arrive at settings of the resistors 42 and 45 which will correctly compensate the voltmeter circuit so that the voltmeter will give accurate power readings throughout the operating range of the machine.

As noted above, the power absorbed by the dynamometer is proportional to the square of the voltage at the voltmeter. In the circuit shown, a conventional D. C. voltmeter is employed with a rectifier. Inasmuch as the deflection of the needle of such a voltmeter is in direct proportion to voltage, the result is that when the voltmeter is calibrated to read directly in power, the scale is expanded for the lower power readings and contracted for the higher power readings. This provides an instrument which can be read accurately over relatively wide power ranges, the expansion of the scale for low power readings being particularly advantageous. If a dynamometer type of instrument is employed, the power will be indicated by a linear scale, inasmuch as the deflection of such an instrument is proportional to $E^2$, to which the power is also proportional.

It will be evident that more than one conductor embedded in the pole faces of the dynamometer could be employed. For example, we may employ a plurality of conductors spaced apart distances equal to one-half of the center-to-center distance betwen the rotor bars 26; these conductors may be connected together in series at their ends into a continuous conductor in such manner that at any given instant, the voltage generated in substantially all parts of the continuous conductor will be in the same direction. The output of such a conductor may be connected to a circuit such as heretofore described or to a circuit employing an ammeter, rather than a voltmeter, to give an indication of power. However, we have found that a single conductor as shown provides sufficient output for most purposes, and we preferably employ a voltmeter circuit such as described above for the reason that the voltmeter circuit minimizes the effects of the resistance of the circuit external of the dynamometer, which external resistance may be quite large in comparison with the resistance of the conductor embedded in the pole face.

While a dynamometer embodying the present invention ordinarily would be provided with a tachometer of conventional construction to indicate the rotational speed of the machine, a frequency meter connected to conductor 39 may be employed as a tachometer, inasmuch as the frequency of the voltage generated in conductor 30 is proportional to the rotational speed of the rotor of the dynamometer.

In the form of the invention shown in Figure 3, a somewhat different type of dynamometer is shown, and a unidirectional, rather than alternating, voltage is employed to give the power indication. In this modification, the dynamometer indicated in general at 50 comprises a stator made up of an outer frame member 51 and inner frame members 52 at each end thereof, these parts being made of steel or other ferro-magnetic material and providing annular air gaps 53. Field coils 54, which are energized from an external D. C. supply, create the flux which may be varied to vary the loading of the machine. The rotor comprises a shaft 56 supported by suitable bearings 57 carried by end frame members 58; the shaft has a central hub 59 secured thereto and supporting the circumferentially spaced, axially extending rotor bars 60 composed of steel or other ferro-magnetic material. The bars extend into the air gaps as in the previous modification, but in this form of the invention, the ends of the bars 60 are secured as by welding or brazing to continuous end rings 61 and 62, which may be composed of brass, steel or other conductive material. The machine is cooled by air as in the case of the previously described form, the heated air being discharged through ports 63. Shaft 56 may be connected to the device whose power output is to be measured by any convenient means (not shown). The shaft is also arranged to drive a tachometer generator 64 through any convenient means such as the chain 65 and sprockets 66 and 67.

In this type of dynamometer, the direction of the flux in both air gaps is the same, thus a unidirectional voltage will be induced in the rotor bars upon rotation of the rotor when the field coils are energized. This voltage is functional of the power absorbed by the machine and thus may be used as to give an indication of power, compensation for changes in speed and temperature again being required to give accurate results. A circuit whereby the rotor voltage may be used as a measure of power is shown above the dynamometer 50 in Figure 3. As there indicated, the voltage is taken to the exterior of the machine by carbon brushes 71 and 72 engaging the rings 61 and 62, respectively. The brushes are connected through terminals 73 and 74 extending through the frame member 51 to conductors 75 and 76 leading to the control grid and cathode, respectively, of the vacuum tube 77; a variable resistor 78 and a resistor 79 having a positive thermal coefficient of resistivity (for a dynamometer in which resistance is the predominant factor of its impedance, as distinguished from the negative coefficient resistor 40 utilized with such a dynamometer in the previous modification) being included in the cathode circuit and being disposed in the path of the heated air discharged from one of the ports 63. The plate voltage is supplied from any convenient D. C. source through conductors 80 and 81, a D. C. ammeter 83 preferably calibrated to read in horsepower being connected in the plate circuit.

In order to correct the meter reading for changes in speed, we preferably employ a screen grid tube as shown and connect the screen grid to the tachometer generator 64 through a variable resistance 84. With the connections as shown in the drawing and the rotation of the machine so that the polarities are as shown, an increase in the voltage generated in the rotor bars 60 will result in an increased grid potential, thus increasing the current flowing through the tube 77 and the ammeter 83. The ammeter 83 accordingly will give a reading generally in accordance with the voltage output of the rotor bars 60 which, as noted above, is functional of the power absorbed by the machine. The necessary corrections for change in speed and temperature are automatically made by the resistor 79 and the tachometer generator 64, the resistor 79 being disposed in the path of the air discharged from the dynamometer will have a temperature varying with the temperature of the dynamometer. Increasing temperatures of resistor 79 will increase its resistance, resulting in a decrease in the potential applied to the control grid, thus compensating for the increase in the resistance of the dynamometer structure with increased temperature. The variable resistance 78 may be used to adjust the effect of the resistor 79.

The tachometer generator is connected as shown so that increasing speeds of the dynamometer will result in increased output of the generator, which will reduce the positive voltage imposed upon the screen grid, thus reducing the flow of current through the tube 77 to compensate for the increased reactance of the dynamometer with increased speeds. The effect of the tachometer generator may be adjusted by the variable resistance 84 in the screen grid circuit. The tachometer generator is also used in the conventional manner with the tachometer 85 to indicate the rotational speed of the dynamometer.

The adjustments of the compensating circuit in this modification of the invention are carried out substantially in the manner described with respect to the previous modification. The effects of the resistor 79 and the tachometer generator are adjusted by means of the resistors 78 and 84 until the ammeter 83 indicates the power output of the machine under varying conditions of speed, temperature and load with the desired degree of accuracy.

From the foregoing description of preferred forms of our invention, it will be evident that we have provided eddy current dynamometers in which the power absorbed by the dynamometers may be read directly from an electrical instrument without requiring the dynamometers to be mounted in cradles and without requiring any calculations. In both forms of the invention, the power absorbed by the dynamometer is determined by measuring, in an external circuit, the effect of an electromotive force which is functional of the power absorbed by the machine, the external circuit being compensated to correct for changes in the characteristics of the dynamometer due to changes in temperature and speed. The effect of the electromotive force may be determined by measuring either the voltage or the current resulting from the electromotive force. While we preferably measure voltages, it is to be understood that the invention is not so limited, and where reference is made to the fact of an electromotive force in the following claims, it is to be understood that we intend to cover measurements of either voltage or current.

Various changes and modifications may be made in our invention without departing from the spirit and scope thereof. Accordingly, it is to be understood that our patent is not limited to the preferred form of the invention disclosed herein or in any manner other than by the scope of the appended claims.

We claim:

1. In combination with an eddy current dynamometer, means for taking a voltage from the dynamometer functional of the power absorbed by the dynamometer, a voltmeter for measuring said voltage as an indication of the power absorbed by the dynamometer, and means in the circuit leading to the voltmeter for compensating said voltage to correct for the effect of changes in temperature of the dynamometer and for the effect of changes in the frequency of the voltages generated therein.

2. In combination with an eddy current dynamometer, means for taking an alternating voltage from the dynamometer functional of the power absorbed by the dynamometer, a voltmeter for measuring said voltage as an indication of the power absorbed by the dynamometer, the circuit leading to said voltmeter including a resistor having a negative temperature coefficient of resistivity, said resistor being positioned so that its temperature is influenced by the temperature of the dynamometer, whereby the resistance of said circuit is reduced as the temperatures of the dynamometer and of the resistor are increased.

3. In combination with an eddy current dynamometer having a pole face subject to changes in flux during operation of the dynamometer whereby an alternating voltage functional of the power absorbed by the dynamometer is induced therein, a conductor extending along said pole face and insulated therefrom, said conductor being subjected to the same changes in flux as the pole face whereby a voltage functional of the power absorbed by the dynamometer is induced in the conductor, means for compensating the voltage induced in said conductor for changes in the impedance of the pole face due to changes in temperature thereof and to changes in the frequency of the induced voltage, and means for measuring the compensated voltage as a measure of the power absorbed by the dynamometer.

4. In combination with an eddy current dynamometer having a pole face subject to changes in flux during operation of the dynamometer whereby an alternating voltage functional of the power absorbed by the dynamometer is induced therein, a conductor extending along said pole face and insulated therefrom, said conductor being subjected to the same changes in flux as the pole face whereby a voltage functional of the power absorbed by the dynamometer is induced in the conductor, means for compensating the voltage induced in said conductor for changes in the resistance of the pole face due to changes in temperature thereof, and means for measuring the compensated voltage as a measure of the power absorbed by the dynamometer.

5. The combination set forth in claim 4, wherein the compensating means comprises a resistor having a negative coefficient of resistivity and subject to temperature changes functional of the temperature of the dynamometer.

6. In combination with an eddy current dynamometer having a pole face subject to changes in flux during operation of the dynamometer whereby an alternating voltage functional of the power absorbed by the dynamometer is induced therein, a conductor extending along said pole face and insulated therefrom, said conductor being subjected to the same changes in flux as the pole face whereby a voltage functional of the power absorbed by the dynamometer is induced in the conductor, means for compensating the voltage induced in said conductor for changes in the reactance of the pole face due to changes in the frequency of the induced voltage, and means for measuring the compensated voltage as a measure of the power absorbed by the dynamometer.

7. The combination set forth in claim 6, wherein the compensating means comprises a condenser connected in such manner as to reduce the voltage applied to said measuring means as the frequency of the voltage increases.

8. In combination with an eddy current dynamometer having a pole face subject to changes in flux during operation of the dynamometer whereby an alternating voltage functional of the power absorbed by the dynamometer is induced therein, said dynamometer having a port from which coolant fluid is discharged during operation of the dynamometer, a conductor extending along said pole face and insulated therefrom, said conductor being subjected to the same changes in flux as the pole face whereby a voltage functional of the power absorbed by the dynamometer is induced in the conductor, an external circuit connected to said conductor including a voltmeter adapted to indicate the power absorbed by said dynamometer, and means for compensating the voltage applied to the voltmeter for changes in the resistance and reactance of the pole face due to changes in temperature thereof and to changes in the frequency of the induced voltage, said means comprising a resistor having a negative coefficient of resistivity connected in parallel with the voltmeter and disposed in the path of coolant fluid discharged from said dynamometer whereby the resistance of said resistor will decrease as the temperature and resistance of the dynamometer pole face increases, and a condenser also connected in parallel with said voltmeter whereby said condenser will draw more current and reduce the voltage applied to said voltmeter as the frequency of the induced voltage increases.

9. In combination with an eddy current dynamometer having a pole face subject to changes in flux during operation of the dynamometer whereby an alternating voltage functional of the power absorbed by the dynamometer is induced therein, said dynamometer having a port from which coolant fluid is discharged during operation of the dynamometer; a conductor extending along said pole face and insulated therefrom, said conductor being subjected to the same changes in flux as the pole face whereby a voltage functional of the power absorbed by the dynamometer is induced in the conductor, a step-up transformer having its primary connected to said conductor, a voltmeter connected across the secondary of said transformer and adapted to indicate the power absorbed by said dynamometer, and means for compensating the voltage applied to the voltmeter for changes in the resistance and reactance of the pole face due to changes in temperature thereof and to changes in the frequency of the induced voltage, said means comprising a resistor having a negative coefficient of resistivity connected in parallel with the voltmeter and disposed in the path of coolant fluid discharged from said dynamometer whereby the resistance of said resistor will decrease as the temperature and resistance of the dynamometer pole face increases, and a condenser also connected in parallel with said voltmeter whereby said condenser will draw more current and reduce the voltage applied to said voltmeter as the frequency of the induced voltage increases.

10. The combination, with an eddy current dynamometer having a field structure providing an annular air gap, a rotor comprising a series of bars adapted to be rotated in said air gap and annular rings connected to said rotor bars on opposite sides of said air gap whereby rotation of said rotor will result in the generation of an electromotive force in said bars functional of the power absorbed by said dynamometer, of means for measuring said electromotive force as a measure of the power absorbed by the said dynamometer and means for compensating the measurements to correct for the effect of changes in the temperature in the dynamometer.

11. The combination defined in claim 10, wherein the means for compensating for temperature changes comprises a resistor disposed in the path of a cooling fluid discharged from the dynamometer.

12. The combination, with an eddy current dynamometer having a field structure providing an annular air gap, a rotor comprising a series of bars adapted to be rotated in said air gap and annular rings connected to said rotor bars on opposite sides of said air gap whereby rotation of said rotor will result in the generation of an electromotive force in said bars functional of the power absorbed by said dynamometer, of brushes engaging said rings, and a circuit connected to said brushes including means for measuring said electromotive force as a measure of the power absorbed by the said dynamometer and means for compensating the measurements to correct for the effect of changes in the speed of operation of the dynamometer.

13. The combination defined in claim 12, wherein the means for compensating for the effect of changes in speed of the dynamometer comprises a tachometer generator, the output of which is applied to the circuit which includes the measuring means in such manner as to reduce the reading of said measuring means for a given generated electromotive force as the speed of operation of the dynamometer is increased.

WILLIAM H. LEE.
ERASMUS D. SMITH.

REFERENCES CITED

The following references are of record in the file of this patent:

UNITED STATES PATENTS

| Number | Name | Date |
|---|---|---|
| 1,635,980 | Highfield | July 12, 1927 |
| 2,028,374 | Anderson | Jan. 21, 1936 |
| 2,188,398 | Bernard | Jan. 30, 1940 |
| 2,278,507 | Baudry | Apr. 7, 1942 |
| 2,297,644 | Angst | Sept. 29, 1942 |
| 2,330,991 | Newton | Oct. 5, 1943 |
| 2,346,976 | Langer et al. | Apr. 18, 1944 |